UNITED STATES PATENT OFFICE.

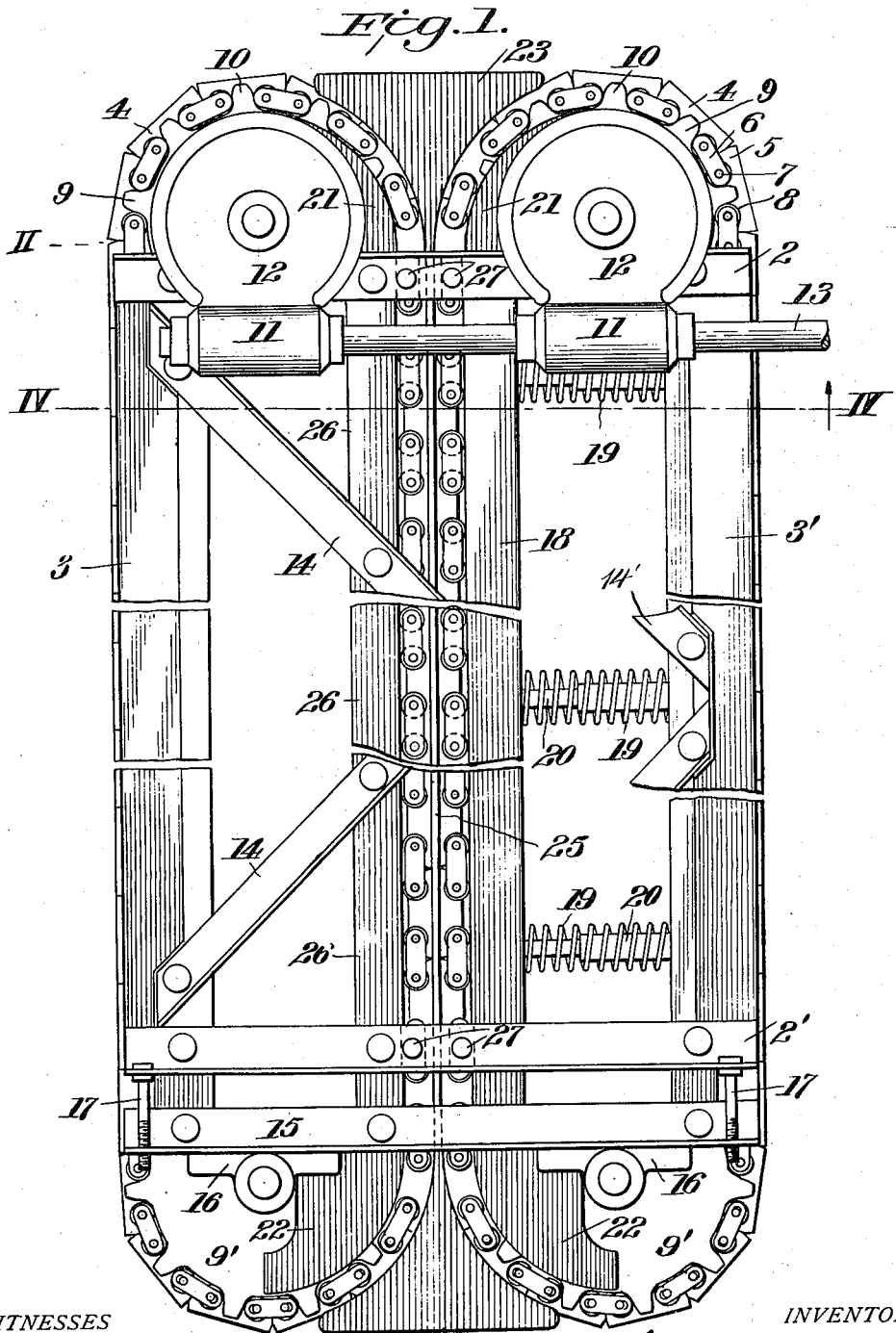

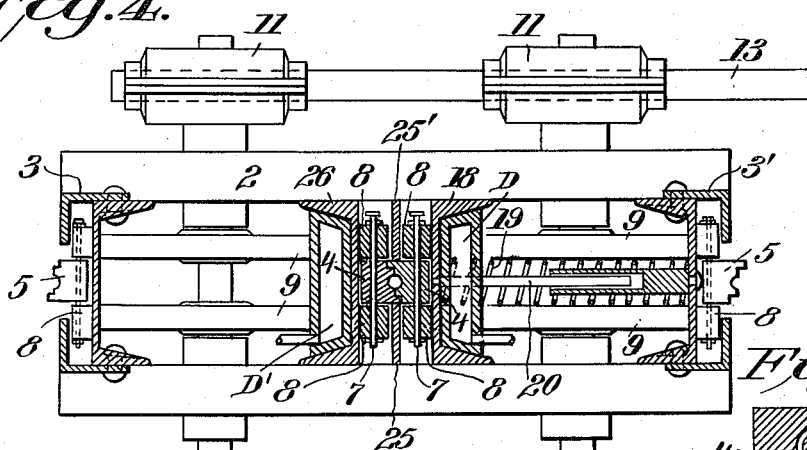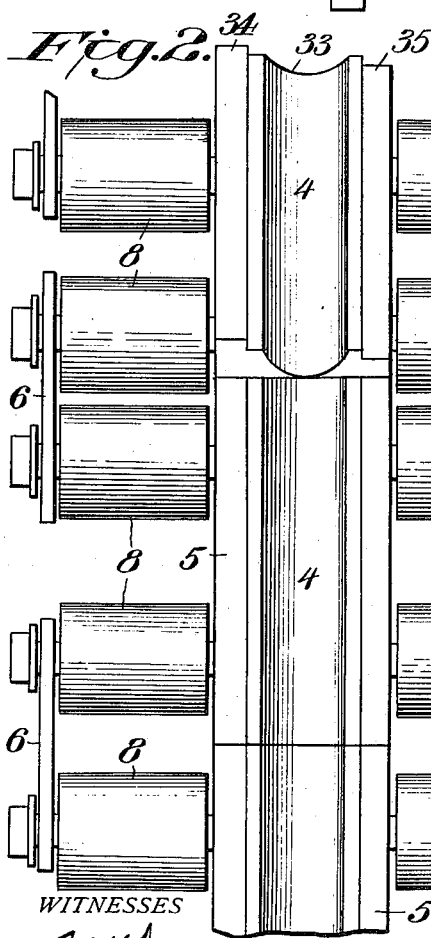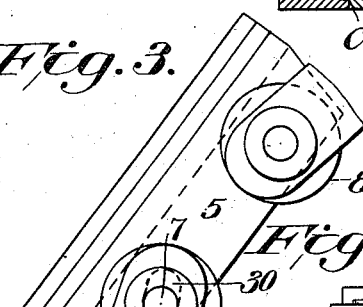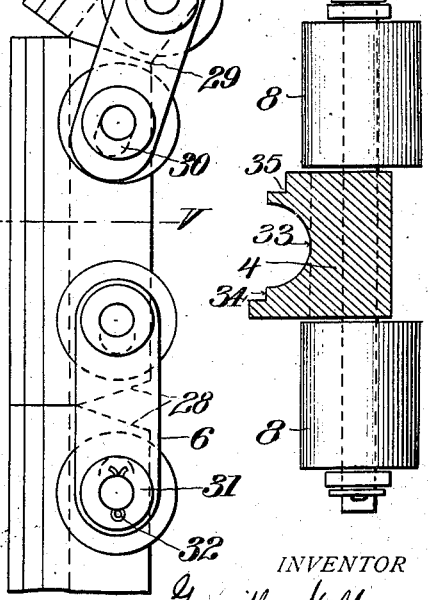

GRENVILLE MELLEN, OF EAST ORANGE, NEW JERSEY, ASSIGNOR TO CONTINUOUS CASTING CORPORATION, OF RICHMOND, VIRGINIA, A CORPORATION OF VIRGINIA.

APPARATUS FOR MAKING RODS AND TUBES FROM PLASTIC METAL.

1,139,884.      Specification of Letters Patent.      Patented May 18, 1915.

Application filed February 13, 1913. Serial No. 748,251.

*To all whom it may concern:*

Be it known that I, GRENVILLE MELLEN, a citizen of the United States, residing at East Orange, in the county of Essex and State of New Jersey, have invented certain new and useful Improvements in Apparatus for Making Rods and Tubes from Plastic Metal, of which the following is a specification.

My invention relates to an apparatus for the continuous casting of molten metal and other fluid or semi-fluid substances into bars, rods, wires, tubes, etc., of various shapes, and in great lengths.

The object of my invention is to make an apparatus that is continuous in operation, does not put any strain on the material being worked other than the pressure of molding into shape, and that is of sufficient length to enable the formed fluid or plastic material to solidify, harden or set, and at the same time to permit a "tempering" of the shaped article, if desired, whereby the excessive brittleness of a quickly cooled article is avoided.

In the accompanying drawings:—Figure 1 is a side elevation of the apparatus, shown broken in two places; Fig. 2 is a top view of the sectional mold and roller supports, as the mold turns over the end sprocket, on the line II of Fig. 1; Fig. 3 is a side view of the same; Fig. 4 is an end view on the line IV—IV of Fig. 1, showing the appearance of the mold sections as they join to form a complete mold, and spring-actuated guides to keep the sectional molds in contact; Fig. 5 is a sectional view of a mold section on the line V—V of Fig. 3; Fig. 6 is a sectional view showing the core or mandrel used when making tubing.

Similar reference characters indicate similar parts.

In Fig. 1, within a framework 1, consisting of end-pieces 2, 2', inclined side-pieces 3, 3', and braces 14, 14', are supported two traveling chain-molds, 4, 4, each consisting of a multiplicity of individual mold sections 5, connected by links 6 through which pass shafts 7, carrying rolls 8. The chain-molds are so positioned as to contact on their faces on their travel through the center of the apparatus, the sections on one chain making a complete mold with the sections on the other chain. Suitably supported by the framework are sprocket wheels, 9, 9, 9', 9', the teeth of which fit in the space between the rolls of a mold section as shown at 10, 10, and propel the chain molds. The sprocket wheels are driven by a worm and gear, suitably inclosed in the casings 11, 12, and driven by the main shaft 13. An expansion member 15 at the lower end of the apparatus, carrying the journal boxes 16, 16, is adjustably positioned by the bolts 17, 17, and permits the stretching of the chain molds to prevent an excess of sagging. The faces of the molds of the two chains are maintained in contact by the movable guide 18 and springs 19, the latter surrounding the pins 20, and supported by the side piece 3'. At the ends of the apparatus are track guides 21, 21, 22, 22, suitably supported by end-piece 2, and expansion member 15, which serve to raise the chain-molds from the sprocket wheels and to bring them into alinement on entering the central passage, the central end guides 23, 24, coöperating with the track guides in effecting correct alinement. During its travel through the central passage, the molds are maintained in side alinement by the side guides 25, 25', supported by the riveted brackets 27, and shown also in Fig. 4. The movable guide 18 serves as a track for the rolls on one set of molds, the fixed guide 26 serving as a track for the rolls on the other molds; the springs 19 exert considerable pressure on the guide 18, producing a tight joint between the faces of the molds on each chain, thereby preventing leakage. For making tubing, a suitable core C (Fig. 6) would be inserted between the upper central end guides 23.

In Figs. 2 and 3, the chain mold is shown entering on the sprocket wheel at II in Fig. 1. In order to make the turn and not to have any lost motion between the separate molds, the body of the mold section is cut on an angle at each end, as shown at 28, 28, in Fig. 3, permitting a closing of the molds at the ends on turning, as shown at 29, Fig. 3. To accommodate this closing, the links 6 are provided with slots 30 for the shafts 7. The links 6 are prevented from coming off the shafts by washers 31 and pins 32.

A section of the mold with shaft and rolls is shown in Fig. 5; in this apparatus each mold-piece constitutes one-half of a complete mold, and contains a depression, or groove 33, of a shape corresponding to one-half of that of the article to be produced; in the illustrations, a mold suitable for making a round rod, or wire, etc., is shown, but other, and also irregular shapes such as plates or other discrete articles could be made by substituting appropriate molds for the circular one. To insure the registering of the mold sections, each face may be provided with self-registering joints, such as a rabbeted joint, shown at 34, 35.

Suitably supported upon the upper end of the apparatus, and within the top end-guide 23, is a hopper, not shown, which feeds molten or plastic material to the traveling molds. In practice, it has been found that for making metal rods, etc., a carbon-lined hopper is preferable. The entire apparatus is preferably inclined so that the fixed guide 26 constitutes a bed on which the chain molds travel downward from the central top end-guide 23 to bottom end-guide 24. The apparatus may, if desired, be suitably cooled or chilled, as by immersing a part or all in water, or by providing the fixed parts with water jackets, as is common in the art of cooling. In Fig. 4, water-cooled boxes D, D' are shown as applied to the guides 18, 26. For making metal articles, the lower two-thirds of the apparatus is preferably cooled or chilled in any suitable manner.

The operation of the apparatus is as follows: The shaft 13 is rotated by any suitable source of power, which in turn drives the sprocket wheels 9, 9 through a suitable worm and gear inclosed in the casings 11, 12. The sprocket wheels 9, 9, propel the chain molds between the guides 18, 26, 25, and 25', which secure the alining and registering of the coöperating mold sections 5. Molten or plastic material is supplied to a hopper, not shown, as above noted, the material flowing into the closed mold and forming an article of the shape determined by the mold used. The material solidifies during its travel through the apparatus, and is delivered in a solid condition at the lower end.

I claim:

1. In an apparatus of the class described, a plurality of separable movable molds, beveled ends on said molds, shafts through said molds, rolls on said shafts, and slotted links engaging a shaft on one mold and a shaft on another mold, thereby permitting a bending of the chain-mold at the beveled ends on said molds.

2. In an apparatus of the class described, the combination of a frame comprising fixed and movable members, sprocket wheels supported by said frame, a plurality of traveling confronting chain-molds supported upon and moved by said sprocket wheels, and guide members to raise said chain-molds from said sprocket wheels and to bring said confronting chain-molds into contact with each other.

3. In an apparatus of the class described, the combination of a frame having a fixed guiding member, a movable guiding member, a set of traveling molds arranged to move along said fixed member, a corresponding set of molds arranged to move along said movable member, means for pressing said movable member toward the fixed member, and lateral guides for maintaining the molds in alinement.

4. In an apparatus of the class described, the combination of a frame having rigid and movable guiding members, traveling molds comprising mold-sections arranged to pass between and be held in alinement by said guide members, means to propel said molds, means to press said mold-sections tightly together, and lateral guides bearing against said mold-sections.

5. In an apparatus of the kind described, a plurality of separate movable molds, shafts through said molds, rolls on said shafts, and slotted links engaging a shaft on one mold and a shaft on another mold.

6. In an apparatus of the class described, the combination of a frame comprising fixed and movable members, sprocket wheels supported by said frame, a plurality of traveling confronting chain-molds each consisting of mold-sections connected together by a slotted link connection, said chain-molds supported upon and moved by said sprocket wheels, and guide members to raise said chain-molds from said sprocket wheels and to bring said confronting chain-molds into contact with each other.

7. In a continuous casting machine, an endless series of traveling coöperating molds comprising loosely linked mold-sections, sprockets at each end over which the series passes, one of said sprockets having power-driving means and arranged to push the mold-sections during their forward movement.

8. In a continuous casting machine, an endless series of traveling coöperating molds comprising loosely linked mold-sections, and sprockets at each end over which the series passes, one of said sprockets having power-driving means.

In testimony whereof I affix my signature in presence of two witnesses.

GRENVILLE MELLEN.

Witnesses:
 LEO LOMENT,
 L. RETURDEL.